_United States Patent_ [19]

Bredt et al.

[11] Patent Number: 4,922,082
[45] Date of Patent: May 1, 1990

[54] THERMAL VALVE GATE FOR PLASTIC MOLDING APPARATUS

[75] Inventors: James F. Bredt, Watertown; Nam P. Suh, Sudbury; Francis A. Waldman, Stoneham, all of Mass.

[73] Assignee: Axiomatics Corporation, Cambridge, Mass.

[21] Appl. No.: 325,160

[22] Filed: Mar. 17, 1989

[51] Int. Cl.$^5$ ............................................. B29C 45/30
[52] U.S. Cl. .................................... 219/541; 219/420; 219/521; 219/553; 264/328.15; 425/547; 425/549
[58] Field of Search ............... 219/420, 421, 424, 426, 219/427, 439, 521, 541, 544, 552, 553; 425/547, 549; 264/219, 319, 328.1, 328.14, 328.15; 137/334, 13

[56] References Cited

U.S. PATENT DOCUMENTS 4,717,521 1/1988 Border .................................. 425/547
4,795,337 1/1989 Gellert .................................. 219/421

_Primary Examiner_—A. D. Pellinen
_Assistant Examiner_—Leon K. Fuller
_Attorney, Agent, or Firm_—Dykema Gossett

[57] ABSTRACT

An ohmically or electrothermally controlled valve gate for injection molding apparatus comprises three concentrically located tubes in intimate contact with each other. The innermost tube is an electrode and also serves as the passage for flowing molding material. The outermost of the three tubes is also an electrode. The intermediate tube is a resistive heating element comprising a mixture of at least two highly compacted powders. One powder is an electrical conductor, while the other powder, which serves as a binder for the first powder, is an electrical insulator but a good thermal conductor. Current flow between the electrodes occurs at points of contact between adjacent particles of the conductive powder. Thus, the electrical resistance and therefore the generation of heat is controlled by the composition and quantity of binder in the heating element. The generated heat is conducted through the inner electrode tube to the flowing plastic to melt the plastic and "open" the gate. Interruption or reduction of current flow reduces the heat and permits the plastic in the passage to freeze, thereby "closing" the gate.

7 Claims, 1 Drawing Sheet

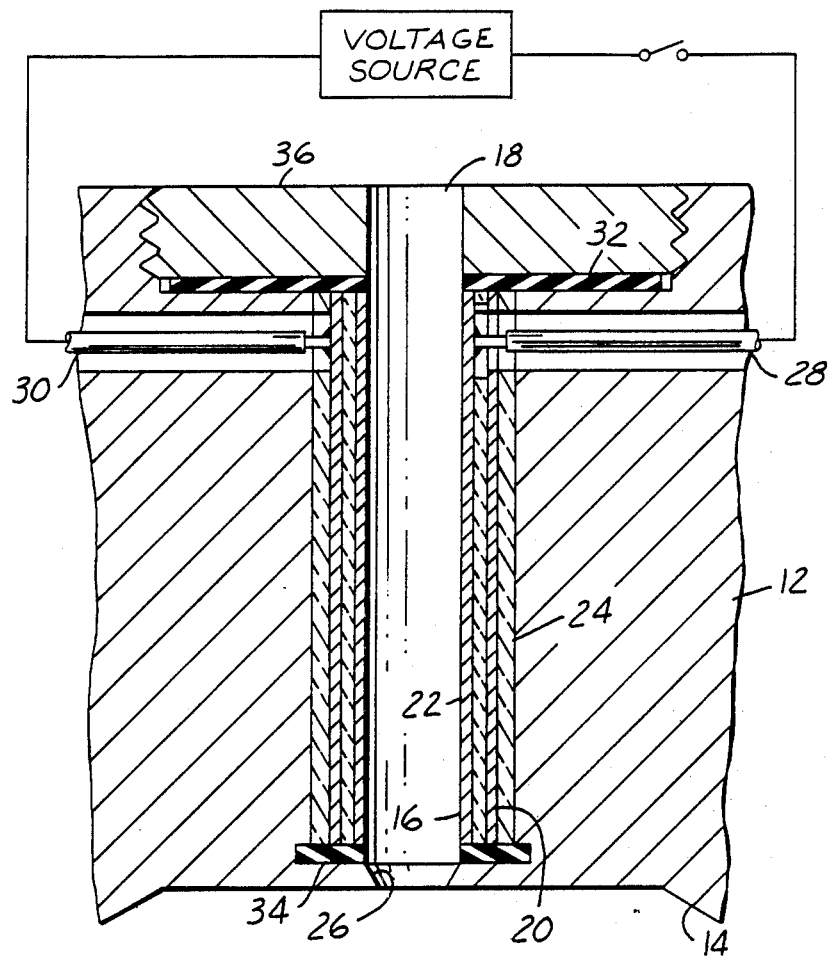
FIG.1
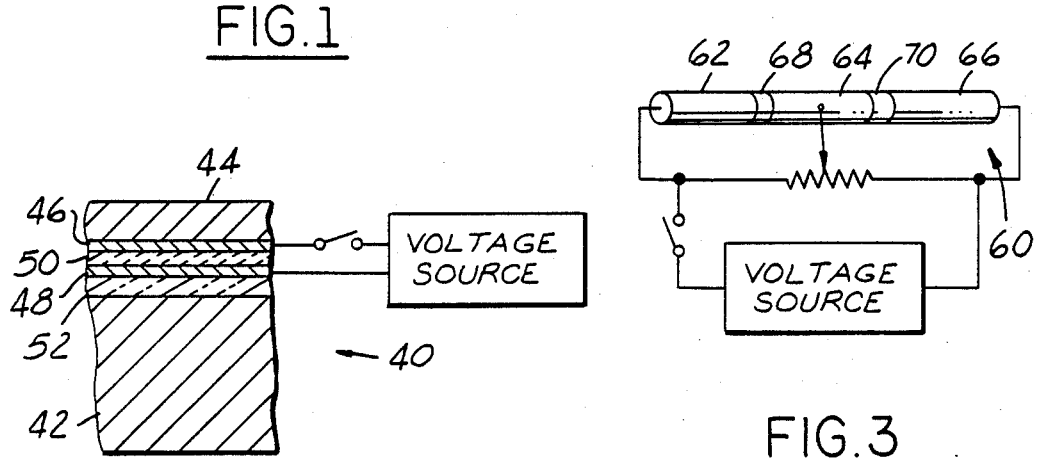
FIG.2
FIG.3

THERMAL VALVE GATE FOR PLASTIC MOLDING APPARATUS

BACKGROUND OF THE INVENTION

This invention involves an improved valve gate in the form of an electrical resistive heater which acts as a valve to control the flow of plastic molding material in applications such as injection molding.

In the well-known injection molding process, thermoplastic material is melted to form a viscous liquid which is then injected under pressure into a mold cavity where it cools and solidifies. Solidification is accompanied by volumetric shrinkage, therefore necessitating the maintenance of a high packing pressure during cooling in order to achieve dimensional accuracy of the molded parts. As the plastic in the mold cavity cools, the packing pressure can decline, without any resulting change in dimensions of the molded plastic part.

It is customary to provide a gate or valve to shut off the plastic flow into the cavity once injection is completed and the packing pressure has been induced, in order to prevent plastic in the mold cavity, which is pressurized, from flowing back into the supply runner. Several techniques have been employed to accomplish this shut-off in the constricted area or gate immediately upstream of the mold cavity. One known technique is to cool the gate area so that the plastic in the gate area freezes once flow has essentially stopped due to filling of the cavity, thereby blocking further flow in either direction. This type of cooling system is continuous, providing an essentially constant temperature, so that no precise control of the plastic flow is possible.

Another general type of construction is the use of a movable pin placed in the flow path to close the gate. However, movable pins introduce substantial complexity accompanied by problems such as wear and misalignment of the pin and valve seat, thereby causing maintenance and reliability problems and expenses.

A thermal gate, which has been marketed by Spear System, Inc. of Chatsworth, California and described in U.S. Pat. No. 3,800,027 to Tsutsumi employs a stationary central axial pin in the constricted gate area. The pin has one heating element in its main body and a separately controlled heating element at its tip, the tip being located in the smallest portion of the flow passage. With the tip heater current on, to melt the gate open, plastic flows longitudinally along the length of the pin in the annular zone between the pin and the surrounding walls of the passage. When the tip heater current is turned off, the plastic freezes in the gate area. There are several disadvantages in the Tsutsumi construction. Some of the flowing plastic passing through the gate area contacts a cooled passage wall, while other portions of the plastic contact the heated wire. The resulting lack of uniform thermal history is often highly undesirable. Secondly, the cooling rate of the Tsutsumi system will be limited by the fact that the wire can only cool by conveying its heat through the plastic to the outer cooled passage walls, because the remainder of the core pin stays hot.

Another patent disclosing a construction somewhat similar to Tsutsumi is Yoshida, U.S. Pat. No. 4,516,927.

In conventional cooled gates, there is no precise control of the plastic temperature in the gate area. Inaccuracy in the control can result in premature freezing of the plastic in the gate before the mold is filled, commonly known as a "short shot". This problem can be remedied only by using higher pressures or higher temperatures. Higher pressures require the use of larger machines and result in higher residual stresses, whereas higher plastic and mold temperatures result in longer cycle times to cool the part, increasing production costs.

To avoid the waste of plastic in runner systems, which freeze along with the molded part and then have to be removed and recycled, it is common to continuously heat the supply manifold throughout the molding cycle. Plastic flow is constricted in the gate area, and only the very tip of the gate, immediately upstream of the cavity, is cooled. However, it is difficult to accurately confine the cooling area to the constricted gate, while maintaining the supply manifold adjacent thereto in heated condition. Undesired continued heating in the gate area may cause the molten material in the molded part close to the gate to remain heated longer than the balance of the molded part. Because crystalline and semi-crystalline plastic molding materials are very sensitive to their thermal history, this lack of precise temperature control in the gate area may result in undesirable physical properties of the resulting molded part.

Laminations of materials possessing differing thermal conductivity properties have been proposed for use in injection molding molds, to improve the physical properties of the molded part. Exemplary of such prior art are the patents to Yotsutsuji, et al., U.S. Pat. No. 4,225,109 (thin metal layer lining mold cavity, formed on layer of heat insulating material, to delay cooling of surface of molded part); Yang, U.S. Pat. No. 4,390,485 (thin layer of electrically resistive metal lining mold cavity to produce rapid heating thereof). Additionally, co-pending U.S. patent application Ser. No. 616,294 of Holden, Suh and Border discloses a variety of laminated constructions which are selected for their ability to heat rapidly by electric resistance heating and to cool rapidly upon termination of electrical current flow, with low thermal inertia and minimal thermal stresses. Such laminated constructions are suggested therein for use in controlling the thermal response of the surface of a mold cavity.

U.S. Pat. No. 4,717,522 to Border, et al. discloses a thermal gate for use in injection molding apparatus wherein a narrow flow passage is formed of a thin-walled tube of iron-nickel alloy which also functions as a resistance heater and which is surrounded by a thin sleeve of electrically non-conductive thermal insulating material having low thermal inertia. The resistance heater and surrounding insulating sleeve are formed of materials having very low and closely matched coefficients of thermal expansion. Flow of molding material is initiated by applying electrical current to the resistance heater, thereby melting the plastic within the tube, whereas flow is terminated by interrupting the electrical current, whereby the previously generated heat is quickly dissipated through the insulating sleeve to the surrounding mold body, thereby freezing the molding material within the passage. This type of construction, while capable of effective performance as a thermal gate, goes involve several disadvantages. The physical properties of the materials and the dimensions necessary to provide low thermal inertia make the thermal gate very fragile and subject to breakage during fabrication and use. Furthermore, the extremely thin wall of the resistive heater tube is subject to wear and ultimate rupture by the flow therethrough of molding compounds which contain abrasive ingredients such as glass fibers.

In the art of ceramic elements, silicon carbide radiant heaters or "glow bars" have been used, but to Applicants' knowledge, conduction type ceramic heaters have not been made from two separate mixed powders, where one functions as an electrtical conductor and the other as an electrical insulator.

Accordingly, it is a principal object of the present invention to provide an improved thermal valve gate which can be economically fabricated in a variety of shapes and sizes, which is reliable and durable in use, and which can be designed for use at a range of power levels.

It is a further object of the present invention to provide an improved electrical resistive heater device which is capable of rapid heating and cooling and which may be fabricated in a variety of shapes and sizes.

SUMMARY OF THE INVENTION

An electrical resistive heating device comprises two spaced apart electrodes, each in intimate surface-to-surface contact with an interposed heating element. The heating element comprises a powdered material which functions as an electrical resistive heater when an electrical potential difference is applied thereacross by the electrodes. Heat generated in such element is conducted through at least one of the electrodes which in turn conducts it to an object which it is desired to heat.

In one embodiment, the heating element comprises a mixture of two powders, one of which is highly conductive electrically and the other of which is highly conductive thermally but relatively highly resistive electrically, and which functions as a binder and diluting agent for the first powder.

In another embodiment, the second powder is also required to have a lower melting point than the first powder, whereby it is melted during fabrication so that it fuses and forms a solid stable binder for the electrically conductive particles of the first powder, which do not dissolve during the fabrication process.

BRIEF DESCRIPTION OF THE DRAWINGS

FIG. 1 is a greatly enlarged fragmentary cross-sectional view of a portion of an injection mold to which the thermal valve gate of the present invention has been applied.

FIG. 2 is a fragmentary cross-sectional view of a heating tile incorporating the present invention.

FIG. 3 is a fragmentary view of a heating rod providing differential heating zones along its length.

DETAILED DESCRIPTION OF THE INVENTION

Referring to FIG. 1, there is illustrated a thermal valve gate assembly 10 inserted into a conventional mold 12 having a part-forming cavity, a portion of which is shown at 14.

The thermal valve gate assembly 10 includes an inner electrode tube 16 which defines a flow passage 18 for molten molding material, an outer electrode tube 20 and a ceramic powder heating element tube 22 located between and in intimate surface to surface contact with the two electrode tubes. Surrounding outer electrode tube 20 is thermal insulating sleeve 24. Heating element 22 heats inner electrode tube 16 to heat the plastic molding material, while mold body 12 acts as a heat sink to quench or freeze the plastic when electrical current is shut off.

The inner or lower end of flow passage 18 is defined by a conventional gate break 26. This narrowed or restricted portion of the passage creates a reduced diameter section in the frozen plug of molding material immediately upstream of the formed part in cavity 14. After injection, as is conventional, the cooled part is ejected from the cavity by pins acting in a downward direction as viewed in FIG. 1. Such downward movement causes the frozen plug to fail in tension and to separate at the point of minimum cross-sectional area and maximum stress, which occurs at gate break 26.

Electrical power is supplied to the electrode tubes by metallurgically joining wires 28, 30 to tubes 16, 20 as shown in Figure 1. Access to the connection points is provided by appropriately placed holes in the tubes and sleeves. Similar access holes may be provided for thermocouple wires (not illustrated) which may be connected to inner electrode tube 16 for monitoring its temperature. Electrical insulation discs 32, 34 are placed at the upper and lower ends of the electrode tubes to electrically isolate them from the adjacent mold structure. Alternatively, the inner electrode 16 can contact gate break 26 and cap 36, in conjunction with electrical grounding of mold body 12, thus eliminating the need for lead 28 to be connected to electrode 16. As is evident from FIG. 1, the electrical current flow path extends from the outer peripheral surface of inner electrode 16 through resistive heating element tube 22 to the inner surface of outer electrode tube 20. Thermal valve gate assembly 10, which may be separately fabricated as a modular part, is secured within mold 12 by means of threaded cap 36.

The composition and method of fabrication of heating element tube 22 are significant aspects in the performance of the thermal valve gate of this invention. Applicants' initial tests were performed utilizing heating elements fabricated of a mixture of two pressed powders, one powder functioning as an electrical conductor element and the other powder functioning as an electrically insulating filler material. The selection of the particular ingredients, their proportions and the packing pressure all contribute to the control of the resistive heating characteristics of heating element tube 22. That is, in addition to the physical properties of the two powder ingredients, the proportions and the packing pressure control the quantity of entrapped air and the number of particle-to-particle electrical contact points or flow paths. The binder or filler material also acts as a thermal conductor to distribute the electrical current-generated heat to inner electrode tube 16 and ultimately to the plastic molding material within passage 18.

The electrical conduction path between the electrodes and through the heating element tube is a tenuous path of electrically conductive powders in a matrix of insulating filler. Because all of the power dissipated in the element occurs at point contacts between conducting powders, these particles reach very high temperatures at a microscopic scale. It is believed that microscopic hot spots may reach temperatures in excess of 5,000° F., and could even involve an arcing phenomenon. This model explains the difficulty in making gates with high resistance. A high resistance means fewer conducting paths, and for the same power dissipation a higher micro hot-spot temperature. Refractory carbides are the only materials that have been found thus far to be suitable for the electrically conductive component.

The conditions which the electrically insulating filler or binder component of the heating element must bear are less severe. Such material must be electrically insulating at all temperatures and voltages, and have a thermal expansion rate that is compatible with the electrode materials.

A first heating element composition which has been tested consisted of 325 mesh niobium carbide (NbC or CbC) powder as the electrically conductive powder, constituting 38% ofo the weight, mixed with 150 mesh powder aluminum oxide ($Al_2O_3$) as the electrically insulating binder and making up the balance of the mixture. An alternative mixture consisted of 325 mesh boron carbide ($B_4C$) as the electrically conductive powder, constituting 16% of the weight, mixed with 150 mesh silicon carbide (SiC) as the electrically insulating binder, making up the remaining 84% of the weight. A third composition consisted once again of 325 mesh boron carbide, 25% by weight, mixed with 325 mesh silica ($SiO_2$) making up the remaining 75% by weight. These mixtures were pressed into the annular space between the two electrode tubes, by partially filling the cavity and compressing the powder with a die under about 30,000 pounds per square inch pressure, and then pouring in additional powder mix and repeating the compression step.

The electride tubes are preferably formed of steel or Inconel. Thermal insulating sleeve 24 preferably is formed of a ceramic powder such as zirconium oxide ($ZrO_2$) which has excellent insulating properties and is profoundly inert. Such power is pressed into the space between thermal valve gate assembly 10 and the surrounding mold body 12 at final assembly. Thermal insulating sleeve 24 forms a bridge between heating element tube 22 and the mold body, the latter functioning as a heat sink.

In some applications it is desirable to achieve a more rapid response time, requiring that insulating sleeve 24 be less insulating and more thermally conductive. For such applications, the preferred composition is 600 mesh $SiO_2$, present at 60% by weight, with a binder, present as 40% by weight, consisting of 20.0% $SiO_2$, 19.6% $Na_2B_4O_7$, 6% $Na_2O$, 37.4% PbO, 9.9% $CaF_2$, and 6.2% $Al_2O_3$, such binder being melted together and ground to 240 mesh.

The performance characteristics or "power rating" of the valve gate refers more to the thermal insulating characteristics of sleeve 24 than it does to the heating element. According to Fourier's law, the rate at which thermal energy is conducted through a wall is proportional to the temperature difference between the two faces of the cross-sectional area of the conduction path through the wall and the thermal conductivity of the wall, and inversely proportional to the wall thickness. Where, as here, the wall thickness of the cylindrical sleeve is much thinner than the sleeve radius, this formula is a good approximation, notwithstanding the cylindrical cnfiguration of the wall.

In the design of the gate, the electrical heating power is balanced with the cooling power of the water-cooled mold at the operating temperature of the device. The "power rating" of the device is the power necessary to maintain the operating temperature of the inner tube, with all of the power being conducted as heat through the thermal insulator sleeve 24 and out to the mold. Thus, different powers will lead to different temperatures in the same device, and if the thermal insulator is made to conduct heat more easily, the power rating will be increased without altering the electrical characteristics of the heating element. A higher power rating means the device will react more quickly, but it also places more of a cooling load on the mold. A lower power gate can be operated at a higher power, with accompanying increase in operating temperature.

In tests to date, the device appears to be most reliable at resistances less than two ohms. Alternating current is preferred, as it provides a more linear current/voltage characteristic.

In addition to the materials discussed above, other potential but untried electrically conductive powders for use in the heating element tube include silicon carbide (with excess carbon), carbides of refractory metals such as zirconium, niobium, molybdenum, hafnium, tantalum and tungsten, refractory borides such as titanium boride, as well as silicides. Possible candidates for the electrically insulating binder of the heating element tube include oxides of calcium, magnesium and boron, boron nitride, $Si_3N_4$, stoichiometric SiC, and oxides or nitrides of metals of Groups IVA, VA and VIA of the Periodic Table.

Initial tests of thermal valve gates made in accordance with the above-described 2-component heating elements indicate a tendency of such valve gates to be mechanically unstable. The electrical resistivity varies when the heating element is vibrated or rapped, apparently because the powders are shifted around, changing the electrical flow paths. For that reason, fusible compounds are preferred for fabricating the heating element tube 22. A fusible heating element requires a ceramic which melts at a relatively low temperature (below 2400° F.). One of at least two ingredients melts at a low temperature to partially dissolve the higher melting point ingredient. It is important that the higher melting point electrically conductive ingredient not completely melt, because the electrically conductive particles might flow together to create an unacceptable number of shorting paths. As more of the higher melting point ingredient dissolves, the melting point of the mixture rises, and the ultimate melting point is then fixed at whatever the sustained maximum temperature was during processing. The structure, including the electrical resistance of the device, should then be stable up to that temperature. The heating element is fused by electrically powering it without cooling until it is uniformly red hot.

When the ceramic binder is in its molten state, it conducts electricity by electrolysis. The resistance of the device drops precipitously when the binder fuses, but rises again when it cools. It is important to fuse the heating element with alternating current to prevent electrolytic breakdown of the ceramic. These elements may also be fused in an oven if the assembly process permits.

In tests conducted to date, the preferred fusible composition utilizes as the conductive powder 600 mesh boron carbide ($B_4C$) present as 47.0% by weight; a filler in the form of 600 mesh $Al_4O_3$ present as 10.0% by weight, and an insulating binder, present as 43.0% by weight, consisting of 95.0% $B_2O_3$, 5.0% ZnO by weight, such binder being melted together and ground to 240 mesh. This mixture, after compression as described above, is heated at about 1050° for two hours to fuse the powders together.

An alternative fusible composition for heating element tube 22 consists of 600 mesh boron carbide, present as 30% by weight; with an insulating binder consisting of 150 mesh alumina ($Al_2O_3$), present as 30% by weight, and 150 mesh boric oxide, present as 40% by weight, this mixture being heated to 1000° C. for five minutes.

Where the thermal valve gate is to be used in conjunction with manifolds and wear-resistant tubes, the electrodes are preferably formed of H-13 tool steel which is hardened at 1010° C. (1850° F.), air quenched and tempered at 540° C. (1000° F.). For such applications, the following fusible heating element composition has been found to perform well, it being heated and fused simultaneously with the above described tempering of the electrodes: 43.0% $B_4C$, 15.0% $Al_2O_3$ and 42.0% binder, which in turn consists of 95.0% $B_2O_3$, 5.0% ZnO.

One of the benefits of fusible compounds for the heating element is that the powders will not sprinkle out of the cavity during handling. Also, the electrical resistance of the fused form of heating element is more controllable, because it is independent of packing pressure; densification is driven by surface tension of the binder.

Response time of the thermal valve gate is about 30° to 60° F. per second, depending on the mass of the heating element. Closing time of the thermal valve is not critical, due to the requirement of maintaining packing pressure in the molding machine. With regard to opening time, because it takes time to heat the plastic, it is contemplated that heating would be timed to begin while the mold is closing.

Because of the unusual current/voltage characteristics of these devices, as well as a tendency to thermal runaway, the controllers should be current limited. One technique would be to put a material in parallel with the heating element which is electrically insulating up to its melting point, after which it conducts electricity. An example is $KNO_3$, which melts at about 800° F. A mixture of 24.9% $NaNo_3$ and 75.1% $CsNO_3$ by weight melts at 380° F. The molten salt would allow the heating element to dissipate power up to the melting point of the salt, which would then melt, shunting the current from the element and thereby causing the element to cool. Under most conditions, the resistance of the device is stable and reproducible enough to operate under open loop control. Temperature monitoring is best accomplished with a thermocouple of which type "K" (nickel-chromium/nickel-aluminum) is preferred.

There are two possible modes of operation of this improved valve gate. First, power is turned on to achieve a temperature 40° to 50° F above the melting point of the plastic to cause plastic flow, and turned partially or fully off to freeze the plastic to stop flow. Alternatively, the power level can be kept constant throughout the molding cycle, at a point which is slightly below the melting point of the plastic. When it is desired to "open" the valve, the pressure from the injector pushes the semi-liquid plastic plug, which has a membrane-thick frozen skin at gate break 26, into mold cavity 14, and friction of the flowing plastic heats it further. When the packing pressure has been reached, flow stops, friction-induced heating stops, and at least partial freezing occurs to "close" the gate.

Depending upon the desired cycle time and temperature range, the range of part sizes may be as follows: flow tube diameter of 0.25 inch internal diameter or less; and the wall thickness of the electrodes in the range of 0.005–0.025 inches; the heating element and the insulator from 0.010 to 0.25 inches.

The valve gate of the present invention offers many advantages. It is durable; the heating element is isolated from abrasive plastic flow; it is machinable; the manufacturing tolerances are a relatively small percentage of the desired wall thickness; the relatively low current and higher voltage (e.g. 5–10 amps and 10 volts) and resistance permits use of smaller wires and contacts; and ease of fabrication reduces the cost. Because the electrical current flow path is radial across a broad surface area, rather than longitudinal or axial along a restricted cross-sectional area, a crack is less likely to cause interruption of current flow and failure of the thermal valve gate.

FIG. 2 illustrates an application of this technology to a planar rather than cylindrical configuration, such as for injection mold surfaces, heating tiles for compact ovens, heated floors or for de-icing outdoor steps. Tile 40 includes a base 42 and a heatable face 44 which is heated by a heater comprising electrodes 46 and 48 and powdered heating element 50. A thermal insulating layer is provided at 52. The choice of materials would be as described above concerning the thermal valve gate.

Referring to FIG. 3 there is shown an elongated rod 60 which can function as a differential heater, i.e., with variable temperatures along its length. High, intermediate and low potential electrodes 62, 64 and 66 are spaced apart by powdered heating elements 68 and 70, utilizing materials as described above. The heating elements can differ from each other in their density or composition, to thereby generate different temperatures, as desired.

This invention may be further developed within the scope of the following claims. Accordingly, the above specification is to be interpreted as illustrative of only a few operative embodiments of the present invention, rather than in a strictly limited sense.

We now claim:

1. An electrical resistive heater device comprising:
   first and second spaced apart electrically conductive electrodes adapted to be connected to different electrical potentials;
   a heating element located between and in intimate physical contact with each of said electrodes;
   said heating element being formed from a mixture of a powdered material which is relatively highly conductive electrically and a ceramic which is relatively highly conductive thermally but relatively highly resistive electrically, said ceramic forming a binder for the particles of said powder;
   whereby the application of an electrical potential gradient across the thickness of said heating element by means of said first and second electrodes causes heat to be generated at points of contact between adjacent particles of said powder where electrical current conducting paths are established, said heat being conducted and distributed throughout said heating element by the matrix of powder and ceramic.

2. The heater device of claim 1, wherein at least one of said electrodes functions as a heat transfer medium to conduct heat generated by said heating element to surfaces of said one electrode which are spaced from the surface which is in intimate contact with said heating element.

3. The heater device of claim 2, wherein said electrodes and said heating elements are in the form of parallel abutting surfaces.

4. The heater device of claim 2, wherein said electrodes and said heating element are in the form of concentric abutting tubes.

5. The heater device of claim 2, which is in the form of an elongated rod-like member wherein said electrodes and said heating elements alternate along the length of said member.

6. An ohmically controlled valve means for controlling the flow of molten molding material into a mold cavity which defines the shape of the part to be molded, said valve means comprising:

a series of three concentric elongated tubes each in intimate abutting contact along a substantial part of its length with the immediately adjacent next inner and outer tubes of said series, said tubes being adapted for mounting as an assembly within the mold;

the innermost and outermost of said tubes comprising electrically conductive electrodes adapted to be maintained at different electrical potentials, said innermost tube also functioning as a molding material flow passage located in the mold immediately upstream of the cavity;

the middle of said tubes functioning as a heating element and being formed from a mixture of a powder which is electrically highly conductive and a ceramic which is thermally highly conductive but electrically highly resistive, said ceramic forming a binder for the particles of said powder;

whereby the application of an electrical potential gradient across the thickness of said heating element by means of said first and second electrodes causes heat to be generated at points of contact between adjacent particles of said powder where electrical current conducting paths are established, said heat being conducted and distributed throughout said heat element by means of said binder, and said heat being further conducted from said heating element through said inner electrode tube;

whereby the generation of sufficient electrical current through said heating element will raise the temperature of said innermost tube wall above that at which the molding material melts, thereby permitting such material to flow through said passage and into the mold cavity, whereas the reduction of said electrical current below a predetermined amperage permits said innermost tube to rapidly cool below the melting point of the molding material to thereby freeze the molding material in said passage and block further flow of molding material therethrough.

7. The valve means of claim 6 which further comprises a fourth concentric elongated tube surrounding and in intimate contact with the exterior surface of said outermost electrode, said fourth tube electrically and thermally insulating said outermost electrode from surrounding portions of the mold, the outer surface of said fourth tube being adapted to convey heat by conduction from said outermost electrode to the mold body.

* * * * *